(12) United States Patent
Morita et al.

(10) Patent No.: US 8,173,098 B2
(45) Date of Patent: May 8, 2012

(54) TITANIUM OXIDE, CATALYST FOR TREATING EXHAUST GAS AND METHOD FOR PURIFYING EXHAUST GAS

(75) Inventors: Atsushi Morita, Kobe (JP); Ryoji Kuma, Himeji (JP); Shinyuki Masaki, Himeji (JP); Motonobu Kobayashi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 585 days.

(21) Appl. No.: 11/886,462

(22) PCT Filed: May 26, 2006

(86) PCT No.: PCT/JP2006/310533
§ 371 (c)(1),
(2), (4) Date: Sep. 17, 2007

(87) PCT Pub. No.: WO2006/132097
PCT Pub. Date: Dec. 14, 2006

(65) Prior Publication Data
US 2008/0152560 A1    Jun. 26, 2008

(30) Foreign Application Priority Data

Jun. 9, 2005 (JP) ................... 2005-169310

(51) Int. Cl.
| | | |
|---|---|---|
| C01G 23/047 | (2006.01) | |
| C01G 28/00 | (2006.01) | |
| C01G 30/00 | (2006.01) | |
| C01B 33/20 | (2006.01) | |
| C01B 21/00 | (2006.01) | |
| C01B 23/00 | (2006.01) | |
| C01B 25/00 | (2006.01) | |
| C01B 31/00 | (2006.01) | |
| C01B 33/00 | (2006.01) | |
| C01B 35/00 | (2006.01) | |
| B01J 21/00 | (2006.01) | |
| B01J 23/00 | (2006.01) | |
| B01J 8/02 | (2006.01) | |
| B01D 53/56 | (2006.01) | |
| B01D 53/94 | (2006.01) | |

(52) U.S. Cl. ............. 423/610; 423/326; 423/213.2; 502/236; 502/242; 502/309; 502/350; 502/353

(58) Field of Classification Search .......... 502/302–304, 502/309, 312, 321, 349, 350, 353, 355, 242; 423/213.2, 240 R, 241, 240 S, 610–616, 423/326, 339
See application file for complete search history.

(56) References Cited

U.S. PATENT DOCUMENTS

| | | | |
|---|---|---|---|
| 6,120,747 A | 9/2000 | Sugishima et al. | |
| 2001/0031700 A1 | 10/2001 | Masaki et al. | |
| 2003/0059359 A1 | 3/2003 | Morita et al. | |
| 2003/0185734 A1 | 10/2003 | Masaki et al. | |
| 2004/0067849 A1 | 4/2004 | Tanaka et al. | |
| 2006/0110319 A1* | 5/2006 | Seok et al. ............. | 423/610 |

FOREIGN PATENT DOCUMENTS

| | | |
|---|---|---|
| EP | 0 850 676 A1 | 7/1998 |
| JP | 08-281103 A | 10/1996 |
| JP | 10-235191 A | 9/1998 |
| JP | 2002-079112 A | 3/2002 |
| JP | 2003-112047 A | 4/2003 |
| JP | 2004-943 A | 1/2004 |
| JP | 2004 243307 A | 9/2004 |
| TW | 592804 B | 6/2004 |

OTHER PUBLICATIONS

JP2003-112047 Machine Translation, published Apr. 15, 2003.*
Notification Concerning Transmittal of International Preliminary Report on Patentability (PCT/IB/326), International Preliminary Report on Patentability (PCT/IB/373) and Written Opinion (PCT/ISA/237) issued in corresponding PCT/JP2006/310533, Dec. 11, 2007, The International Bureau of WIPO, Geneva, CH; and English translation thereof.
Notification of the First Office Action in Chinese Application No. 200680009838.0 dated Feb. 27, 2009, and an English Translation thereof.
Office Action dated May 29, 2009 issued in corresponding Korean Patent Application No. 10-2007-7002541, and an English translation thereof.
PCT/ISA/210 and PCT/ISA/237 for PCT/JP2006/310533 dated Jul. 11, 2006.
Office Action dated Jul. 13, 2010 issued in corresponding Chinese Patent Application No. 200680009838.0, and an English translation thereof.
Official Action issued on Sep. 1, 2011 by the Taiwan Patent Office in corresponding Taiwanese Patent Application No. 095119294, and English language translation of the Official Action.

* cited by examiner

*Primary Examiner* — Steven Bos
*Assistant Examiner* — Anthony J Zimmer
(74) *Attorney, Agent, or Firm* — Buchanan Ingersoll and Rooney PC

(57) ABSTRACT

A catalyst for treating exhaust gases having excellent durability and performance for removing nitrogen oxides and organic halogen compounds and a low $SO_2$ oxidation rate, a titanium oxide suitable for preparing the catalyst and a method for treating exhaust gases containing nitrogen oxides and/or organic halogen compounds using the catalyst are provided.

The BET specific surface areas of the titanium oxide and the catalyst for treating exhaust gases are in the range of 85 to 250 $m^2/g$ and in the range of 50 to 200 $m^2/g$ respectively. The titanium oxide and the catalyst for treating exhaust gases have each a ratio in the range of 15 to 145%, the ratio of the intensity of the peak indicating an anatase crystal present in the range of $2\theta=24.7°$ to $2\theta=25.7°$ of powder X-ray diffraction thereof (Ia) to the intensity of the peak indicating an anatase crystal present in the range of $2\theta=24.7°$ to $2\theta=25.7°$ of powder X-ray diffraction of the standard sample comprising a mixture composed of 15% by mass of pure anatase-type titanium dioxide and 85% by mass of pure rutile-type titanium dioxide (Ib).

16 Claims, No Drawings

US 8,173,098 B2

TITANIUM OXIDE, CATALYST FOR TREATING EXHAUST GAS AND METHOD FOR PURIFYING EXHAUST GAS

TECHNICAL FIELD

The present invention relates to a titanium oxide, a catalyst for treating exhaust gases and a method for purifying exhaust gases. For more details, the present invention relates to a catalyst for treating exhaust gases containing a titanium oxide suitable for removing nitrogen oxides ($NO_x$), organic halogen compounds such as dioxins contained in the exhaust gases discharged from various facilities such as oil-burning boilers, coal-burning boilers, thermal power plants and refuse incinerators, a titanium oxide to be suitably used for the catalyst for treating exhaust gases, and a method for efficiently purifying the exhaust gases containing harmful substances such as nitrogen oxides and organic halogen compounds using the catalyst for treating exhaust gases.

BACKGROUND ART

Presently, as for a method practically used for removing nitrogen oxides in exhaust gases, a selective catalytic reduction method (SCR method) is general, in which SCR method the nitrogen oxides in exhaust gases are catalytically reduced on a catalyst by using a reducing agent such as ammonia and urea and then decomposed to nitrogen and water. Recently, as an environmental pollution caused by nitrogen oxides as represented by acid rain is getting serious worldwide, a catalyst of high performance is strongly demanded.

The exhaust gases generated at incinerators treating industrial wastes and municipal refuse contain toxic organic halogen compounds such as dioxins, PCB and chlorophenol, among which dioxins are extremely harmful even at a trace amount. Effective technology for removing them includes an oxidative decomposition method using a catalyst.

In such situations, it is urgent to develop a catalyst of good performance. The exhaust gases discharged from, for example, incinerators, power plants and refuse incinerators burning heavy oil or coal contain $SO_2$ that is oxidized on a catalyst to $SO_3$, which causes problems such as corroding pipes in the subsequent stage of catalyst and reacting with water and ammonia in the exhaust gases to form $(NH_3)HSO_4$ resulting in performance degradation of the catalyst. Therefore, both of high performance in removing nitrogen oxides and organic halogen compounds and a low $SO_2$ oxidation rate are required as characteristics of the catalyst.

A catalyst of a honeycomb structure for treating exhaust gases that is composed of titanium dioxide and/or a titanium composite oxide was disclosed in, for example, JP-A-2004-943 as an effective catalyst for removing nitrogen oxides and organic halogen compounds, but did not turned out to sufficiently meet the above requirements.

DISCLOSURE OF INVENTION

An object of the present invention is, therefore, to provide a catalyst for treating exhaust gases containing a titanium oxide that can solve the above problems of conventional technology and has excellent durability and performance for removing harmful substances such as nitrogen oxides and organic halogen compounds and a low $SO_2$ oxidation rate, a titanium oxide to be suitably used for the catalyst for treating exhaust gases, and a method for efficiently purifying the exhaust gases containing harmful substances such as nitrogen oxides and organic halogen compounds using the catalyst for treating exhaust gases.

After having intensively studied a way to solve the above problems, the present inventor has found that the catalyst performance can be improved and the $SO_2$ oxidation rate can be controlled by defining the BET specific surface area of a catalyst for treating exhaust gases containing a titanium oxide within a specific range and the degree of crystallization of anatase-type titanium within a specific range, and has completed the present invention.

Namely, the titanium oxide relating to the present invention is a titanium oxide to be used for a catalyst for treating exhaust gases and is characterized in that the BET specific surface area of the titanium oxide is in the range of 85 to 250 $m^2/g$ and that a ratio $[(Ia/Ib) \times 100]$ of the intensity of the peak indicating an anatase crystal present in the range of $2\theta=24.7°$ to $2\theta=25.7°$ of powder X-ray diffraction of the titanium oxide [Ia (count)] to the intensity of the peak indicating an anatase crystal present in the range of $2\theta=24.7°$ to $2\theta=25.7°$ of powder X-ray diffraction of a mixture as the standard sample composed of 15% by mass of pure anatase-type titanium dioxide (produced from Kanto Chemical Co., Inc., Kanto Extra pure grade reagent) and 85% by mass of pure rutile-type titanium dioxide (produced from Kanto Chemical Co., Inc., Guaranteed grade reagent) [Ib (count)], is in the range of 15 to 145%.

Further, the catalyst for treating exhaust gases relating to the present invention is a catalyst for treating exhaust gases containing a titanium oxide and is characterized in that the BET specific surface area of the catalyst is in the range of 50 to 200 $m^2/g$ and that, in the catalyst, the ratio $[(Ia/Ib) \times 100]$ of the intensity of the peak indicating an anatase crystal present in the range of $2\theta=24.7°$ to $2\theta=25.7°$ of powder X-ray diffraction of the catalyst [Ia (count)] to the intensity of the peak indicating an anatase crystal present in the range of $2\theta=24.7°$ to $2\theta=25.7°$ of powder X-ray diffraction of a mixture as the standard sample composed of 15% by mass of pure anatase-type titanium dioxide (produced from Kanto Chemical Co., Inc., Kanto Extra pure grade reagent) and 85% by mass of pure rutile-type titanium dioxide (produced from Kanto Chemical Co., Inc., Guaranteed grade reagent) [Ib (count)], is in the range of 15 to 145%.

Further, the method for treating exhaust gases relating to the present invention is a method for removing harmful substances, specifically nitrogen oxides and/or organic halogen compounds in exhaust gases using the above catalyst for treating exhaust gases.

Use of the catalyst for treating exhaust gases of the present invention enables to efficiently and stably remove nitrogen oxides and organic halogen compounds for a long period and, because of low $SO_2$ oxidation rate, enables to solve the problems such as pipe corrosion caused by generated $SO_3$.

DETAILED DESCRIPTION OF THE EMBODIMENT

Hereinafter, the titanium oxide, the catalyst for treating exhaust gases and the method for treating exhaust gases relating to the present invention are described in detail, but the scope of the present invention is not limited by these descriptions. Other examples than the following examples can be carried out as appropriate within the range where the spirit of the present invention is not impaired.

The catalyst for treating exhaust gases containing a titanium oxide of the present invention (hereinafter, may be abbreviated as "catalyst") is used for treating exhaust gases containing harmful substances, specifically for example, nitrogen oxides ($NO_x$) and/or organic halogen compounds. For more details, the catalyst is used as a denitration catalyst for catalytically reducing nitrogen oxides ($NO_x$) contained in the exhaust gases discharged from various facilities such as oil-burning boilers, coal-burning boilers and thermal power plants using a reducing agent such as ammonia and urea, or as a catalyst for oxidative decomposition of organic halogen compounds such as dioxins discharged from incinerators for treating industrial wastes and municipal refuse. Because of its low $SO_2$ oxidation rate, the catalyst of the present invention is suitably used for treating exhaust gases containing sulfur oxides ($SO_x$), especially $SO_2$ in addition to the above harmful substances. Typical examples of the above organic halogen compounds include chlorinated dioxins, brominated dioxins, polychlorinated biphenyl (PCB), chlorophenol and bromophenol.

The titanium oxide of the present invention is suitable for preparing the above catalyst and has a BET specific surface area in the range of 85 to 250 $m^2/g$ and a ratio [(Ia/Ib)×100] of the intensity of the peak indicating an anatase crystal present in the range of $2\theta=24.7°$ to $2\theta=25.7°$ of powder X-ray diffraction [Ia (count)] to the intensity of the peak indicating an anatase crystal present in the range of $2\theta=24.70$ to $2\theta=25.7°$ of powder X-ray diffraction of a mixture as the standard sample composed of 15% by mass of pure anatase-type titanium dioxide (produced from Kanto Chemical Co., Inc., Kanto Extra pure grade reagent) and 85% by mass of pure rutile-type titanium dioxide (produced from Kanto Chemical Co., Inc., Guaranteed grade reagent) [Ib (count)] in the range of 15 to 145%.

The catalyst of the present invention contains a titanium oxide, preferably a titanium oxide having the above specific properties, and a catalytically active component. As this titanium oxide, (a) titanium dioxide, (b) a composite oxide or a mixed oxide of titanium and at least one element selected from the group consisting of silicon, aluminum, zirconium, tungsten and molybdenum, or (c) a mixture of above (a) and (b) is preferably used. Among these, a composite oxide of titanium and at least one element selected from the group consisting of silicon, aluminum, zirconium, tungsten and molybdenum or a mixture of the composite oxide and titanium dioxide is preferably used. Specific examples of this composite oxide include, for example, a titanium-silicon composite oxide, a titanium-zirconium composite oxide, a titanium-tungsten composite oxide and a titanium-silicon-molybdenum composite oxide and the like. In the case where the titanium oxide is above (b) or (c), the content of titanium is preferably not less than 50% by mole, more preferably not less than 60% by mole and further more preferably not less than 70% by mole based on the total amount the titanium oxide.

The catalytically active component to be used in the catalyst of the present invention is not particularly limited, and may be any component that is effective for decomposition of harmful substances in exhaust gases, specifically, for example, reductive decomposition of nitrogen oxides or oxidative decomposition of organic halogen compounds. In particular, at least one kind selected from the group consisting of vanadium, tungsten and molybdenum, especially at least one kind selected from the group consisting of vanadium and tungsten is preferably used.

The content of the catalytically active component is 0.1 to 20 parts by mass, preferably 0.3 to 15 parts by mass and more preferably 0.4 to 10 parts by mass based on 100 parts by mass of the titanium oxide. As the catalytically active component, a vanadium and/or tungsten compound, especially one having an atomic ratio of a vanadium compound and a tungsten compound of 1:0.1 to 1:20, preferably 1:0.2 to 1:10 is favorable, and in the case where the active component is vanadium and molybdenum, one having a vanadium/molybdenum (atomic ratio) of 1:0.2 to 1:10, preferably 1:0.3 to 1:5 is favorable.

The "standard sample" to be used in powder X-ray diffraction for the titanium oxide and the catalyst relating to the present invention is a mixture composed of 15% by mass of pure anatase-type titanium dioxide (produced from Kanto Chemical Co., Inc., Kanto Extra pure grade reagent) and 85% by mass of pure rutile-type titanium dioxide (produced from Kanto Chemical Co., Inc., Guaranteed grade reagent) and specifically, is obtained by, for example, grinding and mixing in an a gate mortar 0.60 g of anatase-type titanium dioxide produced from Kanto Chemical Co., Inc. (Kanto Extra pure grade reagent) and 3.40 g of rutile-type titanium dioxide produced from Kanto Chemical Co., Inc. (Guaranteed grade reagent). The intensity [Ia (count)] of the peak indicating an anatase crystal present in the range of $2\theta=24.7°$ to $2\theta=25.7°$ of the titanium oxide and the catalyst relating to the present invention (hereinafter, may be abbreviated as "intensity of the peak indicating an anatase crystal") and the intensity [Ib (count)] of the peak indicating an anatase crystal present in the range of $2\theta=24.7°$ to $2\theta=25.7°$ of the standard sample (hereinafter, may be abbreviated as "intensity of the peak indicating an anatase crystal of the standard sample") can be both measured by, for example, the following method.

Instrument: PHILIPS X'Pert Pro
X-ray source: $CuK\alpha$/45 kV/40 mA
Detector: High-speed semiconductor detector
Light receiving filter: Ni Filter
Monochromator: Curved crystal monochromator
Divergent slit: 1°
Scattering slit: 1°
Light receiving slit: 0.5 mm
Step: 0.017°
Measuring time: 5 seconds/step In the titanium oxide of the present invention, it is most important that the BET (Brunaer-Emett-Teller) specific surface area (hereinafter, may be abbreviated as "specific surface area") is in the range of 85 to 250 $m^2/g$, and the ratio [(Ia/Ib)×100] of the intensity of the peak indicating an anatase crystal [Ia (count)] to the intensity of the peak indicating an anatase crystal of the standard sample [Ib (count)] is in the range of 15 to 145%, preferably 25 to 130% and more preferably 35 to 120%, and in the catalyst of the present invention, the specific surface area is in the range of 50 to 200 $m^2/g$, and the ratio [(Ia/Ib)×100] of the intensity of the peak indicating an anatase crystal [Ia (count)] to the intensity of the peak indicating an anatase crystal of the standard sample [Ib (count)] is in the range of 15 to 145%, preferably 25 to 130% and more preferably 35 to 120%. A too small specific surface area can not provide sufficient catalyst activity and a too large specific surface area tends to bring about problems such as increased accumulation of catalyst poisons and shorter catalyst life, while hardly improves catalyst activity. When a larger specific surface area is pursued, the degree of crystallization of anatase-type titanium tends to be lowered. Generally it is expected that anatase-type titanium having a little higher degree of crystallization gives higher catalyst performance, but a conventional catalyst having a high degree of crystallization is not favorable due to insufficient catalyst performance caused by a small specific surface area, and a high $SO_2$ oxidation rate. The present invention has provided a catalyst of high activity and high selectivity by optimizing a balance between the specific surface area and the degree of crystallization of anatase-type titaniums.

Among the titanium oxides of the present invention, considering the performance, for example denitration rate and $SO_2$ oxidation rate, of the catalyst to be obtained therefrom, the oxides having a specific surface area of 85 to 250 $m^2/g$, preferably 90 to 220 $m^2/g$ and the above ratio of peak intensity $[(Ia/Ib)\times100]$ of 40 to 120%, preferably 50 to 100% is favorably used for preparing a catalyst for purifying exhaust gases containing $SO_2$ of about 10 to 5,000 ppm in addition to nitrogen oxides and organic halogen compounds. Among the catalysts of the present invention, considering the catalyst performance, for example denitration rate and $SO_2$ oxidation rate, the oxides having a specific surface area of 50 to 200 $m^2/g$, preferably 60 to 180 $m^2/g$ and the above ratio of peak intensity $[(Ia/Ib)\times100]$ of 50 to 120%, preferably 60 to 100% is favorably used for purifying exhaust gases containing $SO_2$ of about 10 to 5,000 ppm in addition to nitrogen oxides and organic halogen compounds.

The crystallite diameter of anatase-type crystals in the titanium oxide and catalyst of the present invention is in the range of preferably 2 to 30 nm and more preferably 5 to 20 nm.

The intensity of the peak indicating an anatase crystal present in the range of $2\theta=24.7°$ to $2\theta=25.7°$ of the standard sample [Ia (count)] that is measured by the above X-ray diffraction is 823 counts, whereas the intensity of the peak indicating an anatase crystal present in the range of $2\theta=24.7°$ to $2\theta=25.7°$ of a pure anatase-type titanium dioxide (produced from Kanto Chemical Co., Inc., Kanto Extra pure grade reagent) alone [Ib (count)] that is measured by the similar method is 5,661 counts. In other words, the standard sample of the present invention has the peak intensity corresponding to 14.5% ($823 \div 5,661 \times 100$) of the intensity of the peak indicating an anatase crystal present in the range of $2\theta=24.7°$ to $2\theta=25.7°$ of a pure anatase-type titanium dioxide. The degree of anatase crystallization of a titanium oxide and a catalyst can be specified by defining the ratio of the peak intensities of the standard substance and the object catalyst without being affected by the type of a measuring instrument and measuring conditions.

As a raw material of each catalytically active component, oxides, hydroxides, inorganic salts, organic salts and the like of each element are used. Specific examples include ammonium salts, oxalates, sulfates, nitrates and halides. For example, as a titanium source, inorganic titanium compounds such as titanium tetrachloride and titanyl sulfate, organic titanium compounds such as tetraisopropyl titanate and the like can be used. As a silicon source, silica sol, powdered silica, water glass, silicon tetrachloride and the like can be used. As a vanadium source, ammonium metavanadate and the like, as a tungsten source, ammonium metatungstate, ammonium paratungstate and the like, as a molybdenum source, ammonium paramolybdate, molybdic acid and the like can be used.

The method for preparing a catalyst relating to the present invention is described hereinafter taking a catalyst using titanium dioxide as a titanium oxide as an example.

An aqueous solution of a water-soluble titanium compound such as titanium tetrachloride, titanyl sulfate and tetraisopropyl titanate is added dropwise with ammonia water under stirring to obtain a precipitate of a hydroxide of titanium. It is recommended to keep liquid temperature less than or equal to 50° C. in order to suppress formation of crystal nuclei of titanium oxide. Dropping of ammonia water is terminated at a pH of 6 to 9. The obtained precipitate is aged and then filtered, washed, dried and subjected to a temperature of 350 to 550° C., preferably 400 to 500° C. to obtain a powder of titanium dioxide. The obtained powder of titanium dioxide is added with a mixed solution of ammonium metavanadate, oxalic acid and monoethanolamine and an aqueous solution of ammonium metatungstate, and further added with a molding additive and an appropriate amount of water, kneaded and then molded into a honeycomb structure using an extruder. This honeycomb structure is dried sufficiently at 50 to 120° C. and then calcined at 300 to 750° C., preferably 350 to 650° C. for 1 to 10 hours to obtain a molded product.

The method for preparing a catalyst relating to the present invention is described hereinafter taking a catalyst using a composite oxide of titanium and silicon (Ti—Si composite oxide) as a titanium oxide as another example.

A mixed solution of silica sol and ammonia water is added dropwise and slowly under stirring with a liquid or an aqueous solution of a water-soluble titanium compound such as titanium tetrachloride, titanyl sulfate and tetraisopropyl titanate to obtain a slurry. This slurry is subjected to filtration, washing, drying and then calcining to obtain a Ti—Si composite oxide. Although thus obtained Ti—Si composite oxide is basically a composite oxide of titanium and silicon having an amorphous microstructure, crystallization of anatase-type titanium can be promoted by selecting calcining conditions and the like as appropriate. Specifically, it is recommended to set the calcining temperature at 400 to 700° C., preferably 500 to 700° C. The obtained Ti—Si composite oxide powder is added with a mixed solution of ammonium metavanadate, oxalic acid and monoethanolamine and an aqueous solution of ammonium metatungstate, and further added with a molding additive and an appropriate amount of water, kneaded and then molded into a honeycomb structure using an extruder. This honeycomb structure is dried sufficiently at 50 to 120° C. and then calcined at 300 to 750° C., preferably 350 to 650° C. for 1 to 10 hours to obtain a molded product.

The method for preparing a catalyst relating to the present invention is described hereinafter taking a catalyst using a ternary mixed oxide consisting of titanium, silicon and molybdenum (Ti—Si—Mo mixed oxide) as another example.

A molybdate such as ammonium paramolybdate and molybdic acid is dispersed in water and added with silica sol and ammonia water. The obtained aqueous solution is added dropwise and slowly under stirring with a liquid or an aqueous solution of a water-soluble titanium compound such as titanium tetrachloride, titanyl sulfate and tetraisopropyl titanate to obtain a slurry. This slurry is subjected to filtration, washing, drying and then calcining at an elevated temperature, preferably at 300 to 600° C. to obtain a Ti—Si—Mo mixed oxide. The obtained Ti—Si—Mo mixed oxide powder is added with a mixed solution of ammonium metavanadate, oxalic acid and monoethanolamine, and further added with a molding additive and an appropriate amount of water, kneaded and then molded into a honeycomb structure using an extruder. This honeycomb structure is dried sufficiently at 50 to 120° C. and then calcined at 300 to 750° C., preferably 350 to 650° C. for 1 to 10 hours to obtain a molded product.

The reason why the degree of anatase crystallization of the titanium oxide and catalyst of the present invention is lower compared with that of the titanium oxide and catalyst disclosed in the above JP-A-2004-943 is thought that, in a preparation of titanium oxide, a slurry of orthotitanic acid obtained by adding ammonia to a water-soluble titanium compound is used in the above method, whereas a slurry of metatitanic acid obtained by hydrolyzing a solution of a titanium source using hot water is used in the above patent literature. In addition, as long as the BET specific surface area and the ratio of the peak intensity specified in the present invention are satisfied, the titanium oxide and catalyst of the present invention may contain a titanium oxide obtained from a slurry of metatitanic acid (for example, a commercially available titanium oxide) (see Example 5 as hereinafter described).

With regard to the ratio of each component in the catalyst of the present invention, it is favorable that a titanium oxide (hereinafter, referred to as A component) is 70 to 99.9% by mass, preferably 80 to 99.5% by mass as an oxide and a catalytically active component (hereinafter, referred to as B component) is 0.1 to 30% by mass, preferably 0.5 to 20% by mass as a metal oxide based on the total mass of A component and B component. Because the supported content of B component less than 0.1% by mass does not give sufficient performance and the supported content of B component more than 30% by mass brings about a problem such as high $SO_2$ oxidation rate, while hardly improves catalyst activity, the above range is recommended.

The total pore volume of the catalyst of the present invention is in the range of preferably 0.2 to 0.7 ml/g, more preferably 0.3 to 0.6 ml/g. A catalyst with too small pore volume does not give sufficient catalyst performance and a catalyst with too large pore volume tends to bring about problems such as a handling problem caused by low mechanical strength of the catalyst and a problem of low abrasion resistance of the catalyst, while hardly improves catalyst performance.

The shape of the catalyst relating to the present invention is not particularly limited. The catalyst may be molded into any shape of a honeycomb, a board, a corrugated plate, a column, a cylinder and a sphere. The catalyst may be supported on a carrier made of alumina, silica, cordierite, mullite, stainless steel and the like having a shape such as a honeycomb, a board, a corrugated plate, a column, a cylinder and a sphere.

The specific surface area of the catalyst of the present invention, which is in the range of 50 to 200 m$^2$/g, is defined as a specific surface area excluding a carrier, when the catalyst is supported on the carrier made of alumina, silica, cordierite, mullite, stainless steel and the like.

The catalyst of the present invention is used for treating various exhaust gases containing harmful substances. The composition of the exhaust gases is not particularly limited. Since it has excellent activity for decomposing the nitrogen oxides discharged from a boiler, an incinerator, a diesel engine and various industrial processes, the catalyst of the present invention is favorably used for treating exhaust gases containing nitrogen oxides. For removing the nitrogen oxides using the catalyst of the present invention, the catalyst of the present invention is brought into contact with the exhaust gases in the presence of a reducing agent such as ammonia and urea to reduce and remove the nitrogen oxides in the exhaust gases.

In addition, the catalyst of the present invention is favorably used for purifying exhaust gases containing organic halogen compounds generated at incinerators for treating industrial wastes and municipal refuse. For removing the organic halogen compounds using the catalyst of the present invention, the catalyst of the present invention is brought into contact with the exhaust gases to decompose and remove the organic halogen compounds in the exhaust gases. Further, by adding a reducing agent such as ammonia and urea, nitrogen oxides can also be removed at the same time.

The conditions under which nitrogen oxides and organic halogen compounds are removed using the catalyst of the present invention are not particularly limited and the operation can be carried out under the conditions to be generally used in this kind of reaction. Specifically, the conditions may be determined as appropriate considering the kind and properties of exhaust gases to be treated and the required removal rate.

In addition, when treating exhaust gases using the catalyst of the present invention, the inlet temperature of the exhaust gases to the catalyst bed is in the range of preferably 100 to 500° C., more preferably 150 to 450° C. This is because at a lower temperature, the sufficient performance of removal can not be obtained and at a temperature over 500° C., the catalyst life tends to become short. The space velocity is preferably 100 to 200,000 hr$^{-1}$ (STP), more preferably 1,000 to 100,000 hr$^{-1}$ (STP). This is because at a space velocity lower than 100 hr$^{-1}$, a large amount of the catalyst is required, which is not efficient, and at a space velocity exceeding 200,000 hr$^{-1}$, a high removal rate is hardly obtained.

EXAMPLES

The present invention is described more specifically with the following examples without being limited thereto. In the examples, the intensity of the peak indicating the anatase crystal of each catalyst was measured by the following powder X-ray diffraction. The intensity of the peak indicating the anatase crystal of the standard sample was 823 counts.

Instrument: PHILIPS X'Pert Pro
X-ray source: CuKα/45 kV/40 mA
Detector: High-speed semiconductor detector
Light receiving filter: Ni Filter
Monochromator: Curved crystal monochromator
Divergent slit: 1°
Scattering slit: 1°
Light receiving slit: 0.5 mm
Step: 0.017°
Measuring time: 5 seconds/step Example 1

Preparation of Titanium Oxide Powder

An aqueous solution of titanium tetrachloride (200 g/l as $TiO_2$) of 210 liters was added dropwise and slowly to 10% by mass ammonia water of 700 liters while being well stirred and cooled so that the liquid temperature might not exceed 40° C. The obtained gel was left for standing for 3 hours, then filtered, washed with water and dried at 100° C. for 10 hours. This material was calcining at 400° C. for 4 hours and crushed with a hammer mill to obtain a titanium oxide powder. The BET specific surface area, the intensity of the peak indicating an anatase crystal (peak intensity) and the ratio (peak intensity ratio) [(Ia/Ib)×100] of the intensity of the peak indicating an anatase crystal [Ia (count)] to the intensity of the peak indicating an anatase crystal of the standard sample [Ib (count)], of the obtained titanium oxide powder are shown in Table 1.

Addition of Vanadium and Tungsten

Ammonium metavanadate of 0.3 kg, oxalic acid of 0.4 kg and monoethanolamine of 0.1 kg are mixed and dissolved in water of 1 liter to prepare a uniform solution. This vanadium-containing solution and 5 liters of ammonium paratungstate solution (400 g/l as $WO_3$) dissolved in methylamine aqueous solution of 10% by mass along with a molding additive and an appropriate amount of water were added to 20 kg of the previously prepared titanium oxide powder, kneaded in a kneader and then extruded into a honeycomb structure of a square with sides of 80 mm, a length of 500 mm, an opening of 6.25 mm and a thickness of 0.75 mm. The extruded product was then dried at 80° C. and calcined at 450° C. for 3 hours to obtain catalyst A.

The composition of catalyst A was $TiO_2:V_2O_5:WO_3=90:1:9$ (mass ratio) and the BET specific surface area of catalyst A was 73 m$^2$/g. The intensity of the peak indicating an anatase crystal (Ia) of catalyst A was 682 counts and the ratio [(Ia/Ib)×100] (hereinafter, abbreviated as intensity ratio) of the intensity (Ia) to the intensity of the peak indicating an anatase crystal of the standard sample (Ib) was 82.9%.

Example 2

Preparation of Ti—Si Composite Oxide Powder

A mixed solution of 5 kg of a silica sol (containing 20% by mass as $SiO_2$) and 140 kg of 10% by mass ammonia water was added dropwise and slowly with 60 liters of a solution of titanyl sulfate in sulfuric acid (125 g/l as $TiO_2$, sulfuric acid concentration: 550 g/l) while being well stirred and cooled so that the liquid temperature might not exceed 40° C. to form a precipitate. The obtained slurry was aged, filtered, washed and then dried at 150° C. for 10 hours. This dried material was calcined at 550° C. for 6 hours and crushed with a hammer mill to obtain a Ti—Si composite oxide powder. The BET specific surface area, the intensity of the peak indicating an anatase crystal (peak intensity) (Ia) and the ratio (peak intensity ratio) of the intensity of the peak indicating an anatase crystal (Ia) to the intensity of the peak indicating an anatase crystal of the standard sample (Ib), of the obtained Ti—Si composite oxide powder are shown in Table 1.

Addition of Vanadium and Tungsten

Ammonium metavanadate of 0.9 kg, oxalic acid of 1.1 kg and monoethanolamine of 0.3 kg are mixed and dissolved in water of 3 liters to prepare a uniform solution. This vanadium-containing solution and 5 liters of ammonium paratungstate solution (400 g/l as $WO_3$) dissolved in methylamine aqueous solution of 10% by mass along with a molding additive and an appropriate amount of water were added to 20 kg of the previously prepared titanium oxide powder, kneaded in a kneader and then extruded into a honeycomb structure of a square with sides of 80 mm, a length of 500 mm, an opening of 6.25 mm and a thickness of 0.75 mm. The extruded product was then dried at 80° C. and calcined at 450° C. for 3 hours to obtain catalyst B.

The composition of catalyst B was (Ti—Si composite oxide):$V_2O_5:WO_3=88:3:9$ (mass ratio) and the BET specific surface area of catalyst B was 117 m$^2$/g. The intensity of the peak indicating an anatase crystal (Ia) of catalyst B was 598 counts and the ratio of the intensity (Ia) to the intensity of the peak indicating an anatase crystal of the standard sample (Ib) was 72.7%.

Example 3

Catalyst C was obtained by the same preparation method as in Example 2 except that calcining was carried out at 400° C. for 3 hours for obtaining the Ti—Si composite oxide powder. The BET specific surface area, the intensity of the peak indicating an anatase crystal (peak intensity) (Ia) and the ratio (peak intensity ratio) of the intensity of the peak indicating an anatase crystal (Ia) to the intensity of the peak indicating an anatase crystal of the standard sample (Ib), of the obtained Ti—Si composite oxide are shown in Table 1.

The composition of catalyst C was (Ti—Si composite oxide):$V_2O_5:WO_3=88:3:9$ (mass ratio) and the BET specific surface area of catalyst C was 128 m$^2$/g. The intensity of the peak indicating an anatase crystal (Ia) of catalyst C was 272 counts and the ratio of the intensity (Ia) to the intensity of the peak indicating an anatase crystal of the standard sample (Ib) was 33.0%.

Example 4

Catalyst D was obtained by the same preparation method as in Example 2 except that calcining was carried out at 700° C. for 8 hours for obtaining the Ti—Si composite oxide powder. The BET specific surface area, the intensity of the peak indicating an anatase crystal (peak intensity) (Ia) and the ratio (peak intensity ratio) of the intensity of the peak indicating an anatase crystal (Ia) to the intensity of the peak indicating an anatase crystal of the standard sample (Ib), of the obtained Ti—Si composite oxide are shown in Table 1.

The composition of catalyst D was (Ti—Si composite oxide):$V_2O_5:WO_3=88:3:9$ (mass ratio) and the BET specific surface area of catalyst D was 104 m$^2$/g. The intensity of the peak indicating an anatase crystal (Ia) of catalyst D was 736 counts and the ratio of the intensity (Ia) to the intensity of the peak indicating an anatase crystal of the standard sample (Ib) was 89.5%.

Example 5

Ammonium metavanadate of 0.9 kg, oxalic acid of 1.1 kg and monoethanolamine of 0.3 kg are mixed and dissolved in water of 3 liters to prepare a uniform solution. This vanadium-containing solution and 5 liters of ammonium paratungstate solution (400 g/l as $WO_3$) dissolved in methylamine aqueous solution of 10% by mass along with a molding additive and an appropriate amount of water were added to a powder mixture of 14 kg of the Ti—Si composite oxide powder used in Example 2 and 6 kg of a commercially available titanium oxide powder (trade name: DT-51, produced from Millennium Chemicals), kneaded in a kneader and then extruded to produce a honeycomb structure of a square with sides of 80 mm, a length of 500 mm, an opening of 6.25 mm and a thickness of 0.75 mm. The extruded product was then dried at 80° C. and calcined at 450° C. for 3 hours to obtain catalyst E. The BET specific surface area, the intensity of the peak indicating an anatase crystal (peak intensity) (Ia) and the ratio (peak intensity ratio) of the intensity of the peak indicating an anatase crystal (Ia) to the intensity of the peak indicating an anatase crystal of the standard sample (Ib), of the mixture of the above Ti—Si composite oxide and the commercially available titanium oxide are shown in Table 1.

The composition of catalyst E was (Ti—Si composite oxide):$TiO_2:V_2O_5:WO_3=62:26:3:9$ (mass ratio) and the BET specific surface area of catalyst E was 90 m$^2$/g. The intensity of the peak indicating an anatase crystal (Ia) of catalyst E was 1,025 counts and the ratio of the intensity (Ia) to the intensity of the peak indicating an anatase crystal of the standard sample (Ib) was 124.5%.

Comparative Example 1

Ammonium metavanadate of 0.9 kg, oxalic acid of 1.1 kg and monoethanolamine of 0.3 kg are mixed and dissolved in water of 3 liters to prepare a uniform solution. This vanadium-containing solution and 5 liters of ammonium paratungstate solution (400 g/l as $WO_3$) dissolved in methylamine aqueous solution of 10% by mass along with a molding additive and an appropriate amount of water were added to 20 kg of a commercially available titanium oxide powder (trade name: DT-51, produced from Millennium Chemicals), kneaded in a kneader and then extruded to produce a honeycomb structure of a square with sides of 80 mm, a length of 500 mm, an opening of 6.25 mm and a thickness of 0.75 mm. The extruded product was then dried at 80° C. and calcined at 450° C. for 3 hours to obtain catalyst F. The BET specific surface area, the intensity of the peak indicating an anatase crystal (peak intensity) (Ia) and the ratio (peak intensity ratio) of the intensity of the peak indicating an anatase crystal (Ia) to the intensity of the peak indicating an anatase crystal of the standard sample (Ib), of the above titanium oxide are shown in Table 1.

The composition of catalyst F was $TiO_2:V_2O_5:WO_3=88:3:9$ (mass ratio) and the BET specific surface area of catalyst F was 35 $m^2/g$. The intensity of the peak indicating an anatase crystal (Ia) of catalyst F was 2,208 counts and the ratio of the intensity (Ia) to the intensity of the peak indicating an anatase crystal of the standard sample (Ib) was 268.4%.

(Performance Test)

The performance test on denitration and the measurement of $SO_2$ oxidation rates were carried out under the following conditions using catalysts A to F obtained in Examples 1 to 5 and Comparative Example 1.

Reaction Conditions gas temperature: 380° C.
space velocity (STP): 6,125 $hr^{-1}$
Gas Composition:
$NO_x$: 220 ppm dry base
$NH_3$: 220 ppm dry base
$SO_2$: 500 ppm dry base
$O_2$: 4% dry base
$H_2O$: 8% wet base
$N_2$: balance The denitration rate and the $SO_2$ oxidation rate were calculated according to the following equations.

Denitration rate (%)={[($NO_x$ concentration at the reactor inlet)−($NO_x$ concentration at the reactor outlet)]($NO_x$ concentration at the reactor inlet)}×100

$SO_2$ oxidation rate (%)=[($SO_3$ concentration at the reactor outlet)÷($SO_x$ concentration at the reactor inlet)]×100     [Expression 1]

The obtained denitration rate and the $SO_2$ oxidation rate are shown in Table 2 together with the corresponding intensity ratio.

Example 6

Preparation of Ti—Si—Mo Mixed Oxide Powder

Molybdic acid of 1.1 kg was added to a mixed solution of a silica sol (containing 30% by mass as $SiO_2$) of 10 kg, 25% by mass ammonia water of 103 kg and water of 53 liters. The molybdic acid was completely dissolved by stirring well to prepare a uniform solution. 228 liters of a solution of titanyl sulfate in sulfuric acid (70 g/l as $TiO_2$, sulfuric acid concentration: 287 g/l) was added dropwise and slowly to the above obtained solution while being well stirred to form a precipitate. The pH of the obtained slurry was adjusted to be 4 by adding an appropriate amount of ammonia water. This slurry was aged, filtered, washed and then dried at 100° C. for 10 hours. This dried material was calcined at 550° C. for 4 hours and crushed with a hammer mill to obtain a powder. The composition of thus prepared Ti—Si—Mo mixed oxide powder was $TiO_2:SiO_2:MoO_3=80:15:5$ (mass ratio). The BET specific surface area, the intensity of the peak indicating an anatase crystal (peak intensity) (Ia) and the ratio (peak intensity ratio) of the intensity of the peak indicating an anatase crystal (Ib) to the intensity of the peak indicating an anatase crystal of the standard sample, of the Ti—Si—Mo mixed oxide are shown in Table 1.

Addition of Vanadium

Ammonium metavanadate of 1.9 kg, oxalic acid of 2.4 kg and monoethanolamine of 0.6 kg are mixed and dissolved in water of 7 liters to prepare a uniform solution. This vanadium-containing solution, a molding additive and an appropriate amount of water were added to 20 kg of the previously prepared Ti—Si—Mo mixed oxide powder, kneaded in a kneader and then extruded to produce a honeycomb structure of a square with sides of 80 mm, a length of 500 mm, an opening of 3.65 mm and a thickness of 0.6 mm. The extruded product was then dried at 80° C. and calcined at 450° C. for 3 hours to obtain catalyst G.

The composition of catalyst G was (Ti—Si—Mo mixed oxide):$V_2O_5$=93:7 (mass ratio) and the BET specific surface area of catalyst G was 84 $m^2/g$. The intensity of the peak indicating an anatase crystal (Ia) of catalyst G was 877 counts and the ratio of the intensity (Ia) to the intensity of the peak indicating an anatase crystal of the standard sample (Ib) was 106.7%.

Comparative Example 2

A solution of ammonium metavanadate of 2.2 kg, oxalic acid of 2.7 kg and monoethanolamine of 0.6 kg dissolved in water of 8 liters and a solution of ammonium paramolybdate of 2.9 kg and monoethanolamine of 1.1 kg dissolved in water of 3 liters were added to a commercially available titanium oxide powder (trade name: DT-51, produced from Millennium Chemicals) of 20 kg, kneaded along with a molding additive in a kneader and then extruded to produce a honeycomb structure of a square with sides of 80 mm, a length of 500 mm, an opening of 3.65 mm and a thickness of 0.6 mm. The extruded product was then dried at 80° C. and calcined at 450° C. for 3 hours to obtain catalyst H.

The composition of catalyst H was $TiO_2:MoO_3:V_2O_5=83:10:7$ (mass ratio) and the BET specific surface area of catalyst H was 31 $m^2/g$. The intensity of the peak indicating an anatase crystal (Ia) of catalyst H was 2,383 counts and the ratio of the intensity (Ia) to the intensity of the peak indicating an anatase crystal (Ib) of the standard sample was 289.7%.

(Performance Test)

The performance test on decomposition of chlorinated organic compounds and the measurement of $SO_2$ oxidation rate were carried out under the following conditions using catalysts G obtained in Example 6 and catalyst H obtained in Comparative Example 2. As a chlorinated organic compound to be treated, o-chlorotoluene (hereinafter, abbreviated as CT) was used.

Reaction Conditions gas temperature: 250° C.
space velocity (STP): 7,950 $hr^1$
gas composition:
CT: 200 ppm dry base
$SO_2$: 500 ppm dry base $O_2$: 9% dry base
$H_2O$: 10% wet base
$N_2$: balance The CT decomposition rate was calculated by the following equation.

CT decomposition rate (%)={[(CT concentration at the reactor inlet)−(CT concentration at the reactor outlet)]÷(CT concentration at the reactor inlet)}×100       [Expression 2]

The obtained CT decomposition rate and the $SO_2$ oxidation rate are shown in Table 3.

TABLE 1

| | kind of powder | BET specific surface area (m²/g) | peak intensity (count) | peak intensity ratio (%) |
|---|---|---|---|---|
| Exam. 1 | titanium oxide | 105 | 610 | 74.2 |
| Exam. 2 | Ti—Si composite oxide (calcined at 550° C.) | 154 | 509 | 61.9 |
| Exam. 3 | Ti—Si composite oxide (calcined at 400° C.) | 187 | 204 | 24.8 |
| Exam. 4 | Ti—Si composite oxide (calcined at 700° C.) | 121 | 695 | 84.5 |
| Exam. 5 | mixture of Ti—Si composite oxide & titanium oxide (*) | 129 | 936 | 113.8 |
| Com. Ex. 1 | titanium oxide (*) | 82 | 2049 | 249.1 |
| Exam. 6 | Ti—Si—Mo mixed oxide | 131 | 832 | 101.2 |
| Com. Ex. 2 | titanium oxide (*) | 82 | 2049 | 249.1 |

(*): commercially available

TABLE 2

| | | BET specific surface area (m²/g) | peak intensity ratio (%) | Denitration rate (%) | $SO_2$ oxidation rate (%) |
|---|---|---|---|---|---|
| Exam. 1 | catalyst A | 73 | 82.9 | 94.6 | 2.2 |
| Exam. 2 | Catalyst B | 117 | 72.7 | 96.9 | 2.0 |
| Exam. 3 | Catalyst C | 128 | 33.0 | 92.5 | 1.6 |
| Exam. 4 | Catalyst D | 104 | 89.5 | 97.2 | 2.5 |
| Exam. 5 | Catalyst E | 90 | 124.5 | 97.3 | 3.4 |
| Com. Ex. 1 | Catalyst F | 35 | 268.4 | 81.4 | 9.7 |

TABLE 3

| | | BET specific surface area (m²/g) | peak intensity ratio (%) | CT decomposition rate (%) | $SO_2$ oxidation rate (%) |
|---|---|---|---|---|---|
| Exam. 6 | catalyst G | 84 | 106.7 | 90.9 | 0.2 |
| Com. Ex. 2 | Catalyst H | 31 | 289.7 | 81.7 | 0.7 |

Example 7

Preparation of Ti—Si Composite Oxide Powder

A mixed solution of 5 kg of a silica sol (containing 20% by mass as $SiO_2$) and ammonia was added dropwise and slowly with 38 liters of an aqueous solution of titanium tetrachloride (200 g/l as $TiO_2$) while being well stirred to form a precipitate. The obtained slurry was aged, filtered, washed and then dried at 150° C. for 10 hours. This dried material was calcined at 500° C. for 5 hours and crushed with a hammer mill to obtain a Ti—Si composite oxide powder. The BET specific surface area of the Ti—Si composite oxide powder was 156 m²/g. The intensity of the peak indicating an anatase crystal (Ia) of the Ti—Si composite oxide powder was 357 counts and the ratio of the intensity (Ia) to the intensity of the peak indicating an anatase crystal of the standard sample (Ib) was 43.4%.

Addition of Vanadium and Tungsten

Ammonium metavanadate of 0.6 kg, oxalic acid of 0.7 kg and monoethanolamine of 0.2 kg are mixed and dissolved in water of 2 liters to prepare a uniform solution. This vanadium-containing solution and 5 liters of ammonium paratungstate solution (400 g/l as $WO_3$) dissolved in methylamine aqueous solution of 10% by mass along with a molding additive and an appropriate amount of water were added to 20 kg of the previously prepared Ti—Si composite oxide powder, kneaded in a kneader and then extruded to produce a honeycomb structure of a square with sides of 80 mm, a length of 500 mm, an opening of 6.25 mm and a thickness of 0.75 mm. The extruded product was then dried at 80° C. and calcined at 450° C. for 3 hours to obtain catalyst I.

The composition of catalyst I was (Ti—Si composite oxide):$V_2O_5$:$WO_3$=89:2:9 (mass ratio) and the BET specific surface area of catalyst I was 122 m²/g. The intensity of the peak indicating an anatase crystal (Ia) of catalyst I was 425 counts and the ratio of the intensity (Ia) to the intensity of the peak indicating an anatase crystal of the standard sample (Ib) was 51.6%.

Example 8

Ammonium metavanadate of 0.75 kg, oxalic acid of 0.9 kg and monoethanolamine of 0.25 kg are mixed and dissolved in water of 2.5 liters to prepare a uniform solution. This vanadium-containing solution and 5 liters of ammonium paratungstate solution (400 g/l as $WO_3$) dissolved in methylamine aqueous solution of 10% by mass along with a molding additive and an appropriate amount of water were added to 20 kg of the Ti—Si composite oxide powder prepared in Example 7, kneaded in a kneader and then extruded to produce a honeycomb structure of a square with sides of 80 mm, a length of 500 mm, an opening of 6.25 mm and a thickness of 0.75 mm. The extruded product was then dried at 80° C. and calcined at 450° C. for 3 hours to obtain catalyst J.

The composition of catalyst J was (Ti—Si composite oxide):$V_2O_5$:$WO_3$=88.5:2.5:9 (mass ratio) and the BET specific surface area of catalyst J was 119 m²/g. The intensity of the peak indicating an anatase crystal (Ia) of catalyst J was 476 counts and the ratio of the intensity (Ia) to the intensity of the peak indicating an anatase crystal of the standard sample (Ib) was 57.8%.

(Performance Test)

The performance test on denitration and the measurement of $SO_2$ oxidation rate were carried out under the similar conditions as for the catalysts A to F obtained in Examples 1 to 5 and Comparative Example 1. The results are shown in Table 4.

TABLE 4

|  |  | BET specific surface area (m²/g) | peak intensity ratio (%) | Denitration rate (%) | SO₂ Oxidation rate (%) |
|---|---|---|---|---|---|
| Exam. 7 | catalyst I | 122 | 51.6 | 94.7 | 1.3 |
| Exam. 8 | Catalyst J | 119 | 57.8 | 95.1 | 1.5 |

The invention claimed is:

1. A titanium oxide to be used for a catalyst for treating exhaust gases, wherein the BET specific surface area of said titanium oxide is in the range of 85 to 250 m²/g and that the ratio [(Ia/Ib)×100] of the intensity of the peak indicating an anatase crystal present in the range of 2θ=24.7° to 2θ=25.7° of powder X-ray diffraction of said titanium oxide [Ia (count)] to the intensity of the peak indicating an anatase crystal present in the range of 2θ=24.7° to 2θ=25.7° of powder X-ray diffraction of a standard sample mixture composed of 15% by mass of pure anatase titanium dioxide and 85% by mass of pure rutile titanium dioxide [Ib (count)], is in the range of 15 to 145%, and the titanium oxide is selected from the group consisting of a titanium dioxide, a composite oxide of elements consisting of titanium and silicon, and a mixture thereof.

2. A titanium oxide to be used for a catalyst for treating exhaust gases, wherein the BET specific surface area of said titanium oxide is in the range of 85 to 250 m²/g and that the ratio [(Ia/Ib)×100] of the intensity of the peak indicating an anatase crystal present in the range of 2θ=24.7° to 2θ=25.7° of powder X-ray diffraction of said titanium oxide [Ia (count)] to the intensity of the peak indicating an anatase crystal present in the range of 2θ=24.7° to 2θ=25.7° of powder X-ray diffraction of a standard sample mixture composed of 15% by mass of pure anatase titanium dioxide and 85% by mass of pure rutile titanium dioxide [Ib (count)], is in the range of 15 to 145%, and the titanium oxide comprises titanium dioxide, a composite oxide of elements consisting of titanium and silicon, or a mixture thereof, wherein the titanium oxide is obtained by maintaining a temperature of an ammonia water containing reactants for forming the titanium dioxide, at less than or equal to 50° C.

3. The titanium oxide according to claim 2, wherein the amount of titanium in said composite oxide is not less than 50 molar %.

4. The titanium oxide according to claim 2, wherein said ratio [(Ia/Ib)×100] is in the range of 25 to 130%.

5. The titanium oxide according to claim 2, wherein said ratio [(Ia/Ib)×100] is in the range of 35 to 120%.

6. The titanium oxide according to claim 2, wherein said BET specific surface area is in the range of 90 to 220 m²/g.

7. A catalyst for treating exhaust gases containing a titanium oxide according to claim 1 and a catalytically active component, wherein the BET specific surface area of said catalyst is in the range of 50 to 200 m²/g and that the ratio [(Ia/Ib)×100] of the intensity of the peak indicating an anatase crystal present in the range of 2θ=24.7° to 2θ=25.7° of powder X-ray diffraction of said catalyst [Ia (count)] to the intensity of the peak indicating an anatase crystal present in the range of 2θ=24.7° to 2θ=25.7° of powder X-ray diffraction of a standard sample mixture composed of 15% by mass of pure anatase titanium dioxide and 85% by mass of pure rutile titanium dioxide [Ib (count)], is in the range of 15 to 145%, and the titanium oxide comprises titanium dioxide, a composite oxide of elements consisting of titanium and silicon, or a mixture thereof.

8. The catalyst according to claim 7, wherein the amount of titanium in said composite oxide is not less than 50 molar %.

9. The catalyst according to claim 7, wherein said ratio [(Ia/Ib)×100] is in the range of 25 to 180% 130%.

10. The catalyst according to claim 7, wherein said ratio [(Ia/Ib)×100] is in the range of 35 to 120%.

11. The catalyst according to claim 7, wherein said BET specific surface area is in the range of 60 to 180 m²/g.

12. The catalyst according to claim 7, wherein said catalytically active component is a compound of at least one element selected from the group consisting of vanadium, tungsten and molybdenum.

13. The catalyst according to claim 7, wherein the content of said catalytically active component is in the range of 0.1 to 20 parts by mass based on 100 parts by mass of said titanium oxide.

14. The catalyst according to claim 7, wherein said catalytically active component is a compound of vanadium and/or a compound of tungsten.

15. The catalyst according to claim 14, wherein an atomic ratio of said vanadium compound and tungsten compound is in the range of 1:0.1 to 1:20.

16. A method for purifying exhaust gases, comprising contacting exhaust gases containing harmful substances with the catalyst according to claim 7.

* * * * *